Nov. 29, 1966 D. V. HAREN 3,288,170

REINFORCED CORRUGATED HOSE

Filed June 24, 1964 2 Sheets-Sheet 1

INVENTOR.
DOYLE V. HAREN
BY
Reuben Wolk
ATTORNEY

INVENTOR.
DOYLE V. HAREN
BY Reuben Wolk
ATTORNEY

United States Patent Office 3,288,170
Patented Nov. 29, 1966

3,288,170
REINFORCED CORRUGATED HOSE
Doyle V. Haren, Clyde, N.C., assignor to Dayco Corporation, Dayton, Ohio, a corporation of Ohio
Filed June 24, 1964, Ser. No. 377,558
8 Claims. (Cl. 138—122)

This invention relates to hose for conveying fluids such as air, and the method of manufacturing same. More particularly the invention relates to a fluid-impervious hose containing a radial reinforcement to withstand pressure and prevent collapse when used in low pressure vacuum systems, oxygen systems, hair dryers, respirating devices, and the like.

The type of hose referred to herein usually comprises a body of elastomeric material which is reinforced against radial collapse by a reinforcing member having axially spaced helical coils. The conventional hose of the type generally referred to herein is somewhat similar in construction to those more fully described in United States Patent No. 2,766,806; No. 2,782,803, and No. 2,822,857, of common assignment. This is the type of hose which has found wide acceptance in various industries because of its lightness and strength, and the fact that it is sufficiently flexible to permit bending and yet remain impervious to leakage of the fluid which it carries. In this conventional hose the outer tubular member usually consists of an elastomeric material such as polyvinyl chloride or other similar materials. The reinforcing member usually consists of a steel wire which has been coated with an elastomeric material similar to that of the tubular member and formed into helical coils.

The hose of the present invention represents an improvement over the prior art in providing additional reinforcing means. The novel hose consists of a helical reinforcement having axially spaced coils in the form of a spring, the coils preferably being first coated with an elastomeric material such as polyvinyl chloride. As more fully described in the above patents, this reinforcement is made by first coating steel wire with the elastomeric material and forming it into the reinforcement of a predetermined diameter. Over this reinforcement is placed a tubular knitted stockinet made of nylon, polyester fibers, or similar materials; this member has been previously formed in tubular shape and is simply pulled over the reinforcement. Over the stockinet is spirally wound a cord made of nylon or polyester fibers; this cord is applied circumferentially and forced down by mechanical means intermediate of the coils and in an axial direction so that there is a resultant radial inward force applied against the stockinet which tends to create convolutions inwardly of the assembly between the coils. The exterior of this assembly is also convoluted because of the restrictive force of the coils. Over this entire assembly is placed an outer tube made of polyvinyl chloride or the like, preferably similar in material to the coating of the wire. The tubular stockinet has also been coated with a material similar to that of the outer tube. The final assembly is then subjected to heat, which causes it to become uniformly bonded together due to the fact that the elastomeric materials will tend to flow and adhere to the outer tube and to the coating material of the stockinet, and also adhere the wire coating to those portions of the stockinet which are in contact therewith. The circumferentially applied cord which has created the convolutions will be trapped between the stockinet and the outer tube and a certain amount of bonding may also take place.

It is accordingly a principal object of the present invention to produce a fluid-impervious hose which is reinforced against radial compression.

It is another object of the invention to provide such a hose having an evenly corrugated exterior surface.

It is still another object to provide such a hose in which the outer tube is reinforced to provide additional strength.

It is another object of the invention to provide such a hose which is unitary in its final configuration.

It is another object of the invention to provide a simple method of manufacturing such a hose.

These and other objects will be apparent in the following specifications, claims, and drawings, in which:

Figure 1:
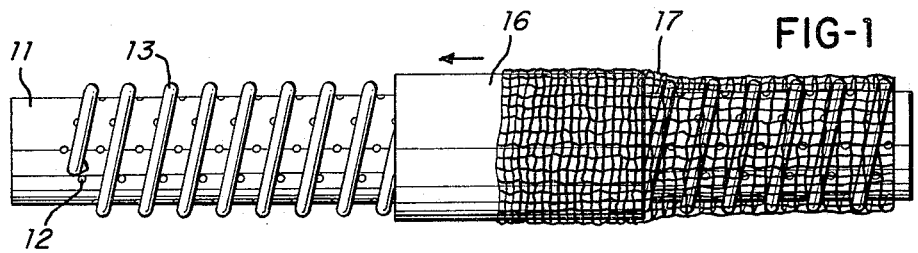
FIGURE 1 is an elevational view illustrating the first step in the manufacture of the product of the present invention.

Referring now to the drawings, FIGURE 1 illustrates a building mandrel 11 which is manufactured of steel or similar material and having a series of apertures 12 extending to a hollow interior. Reference numeral 13 designates the reinforcement which, as shown in greater detail in FIGURE 3, comprises a wire core 14 and a coating 15 of elastomeric material. This material may be polyvinyl chloride, polyethylene, or the like. Also illustrated in FIGURE 1 is a hollow tubular member 16 which may be made of steel, plastic, wood, or any other conventional material; placed upon this member 16 is a tubular knitted stockinet 17 which has been compressed sufficiently so that its entire length may be retained on member 16. This stockinet has been knitted in conventional fashion in a tubular shape and has been subsequently coated with material such as vinyl plastisol or any other material which is similar in composition to the coating 15; or alternatively, the threads making up the stockinet may be coated prior to knitting. As shown in FIGURE 1, the member 16, which is greater in diameter than the reinforcement 13, has been placed over the reinforcement. The right-hand end of the stockinet fits snugly around the reinforcement while member 16 is slid to the left. This results in the stockinet being pulled off the member 16 so that it completely surrounds and contacts the coils of the reinforcement 13. It will then assume the relationship shown at the left in FIGURE 2.

Figure 2:
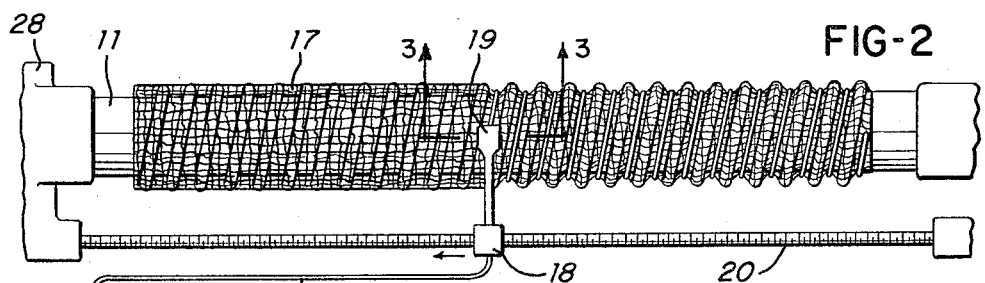
FIGURE 2 is an elevational view illustrating a further step in the manufacture of the novel product.
Figure 3:
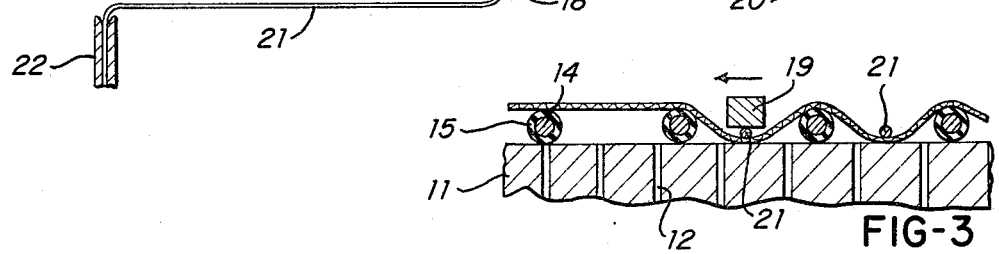
FIGURE 3 is a cross-sectional view taken along lines 3—3 of FIGURE 2.

The next step of the operation is illustrated in FIGURE 2 in which the mandrel is mounted in a rotating mechanism designated by reference numeral 28; this may be a lathe or other similar machine tool which is capable of rotating the mandrel at a predetermined speed. Part of the mechanism 28 also includes a threaded shaft 20 upon which is mounted a traveling head 18. The rotation of the mandrel and of the threaded shaft 20 will both be accomplished by a geared mechanism in the machine 28. Also attached to the head 18 is a pressure head 19 which is located above the mandrel. A cord 21 which is carried from a supply 22 is fed to the pressure head. This cord consists of nylon strands of about 120 denier or may consist of similar material such as polyester fibers. The cord is place around the right-hand end of the stockinet and when the machine 28 is operated the mandrel rotates and at the same time the shaft 20 rotates causing the head 18 and the pressure head 19 to travel to the left. This causes the cord 21 to be fed along the surface of the stockinet. By locating the cord midway of the coils of the reinforcement in an axial direction the cord will thus be applied circumferentially in a spiral fashion between these coils. The head 19 will tend to force the cord inward so that it has radial tension, and as shown in FIGURE 3, will tend to create corrugations in the stockinet. This procedure is continued until the entire length of the stockinet has been wrapped with the cord.

Figure 4:
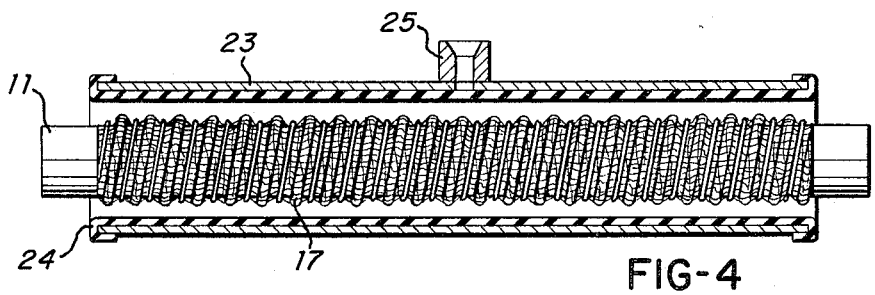
FIGURE 4 is an elevational view in partial cross section illustrating a further step in the manufacture of the novel hose.

As a next step in the process, a tube 24 is extruded from polyvinyl chloride or similar material and placed in a vacuum box 23 as illustrated in FIGURE 4. The ends are cuffed over as shown, and vacuum applied to the box through the opening 25. The mandrel, stockinet and cord assembly is placed within the vacuum box, the vacuum is released, and the tube is allowed to snap over the entire assembly. The outer tube, of course, will follow the corrugations formed by the cord 21 so that the outer surface of the assembly will now have a corrugated appearance as in a conventional hose.

Figure 5:
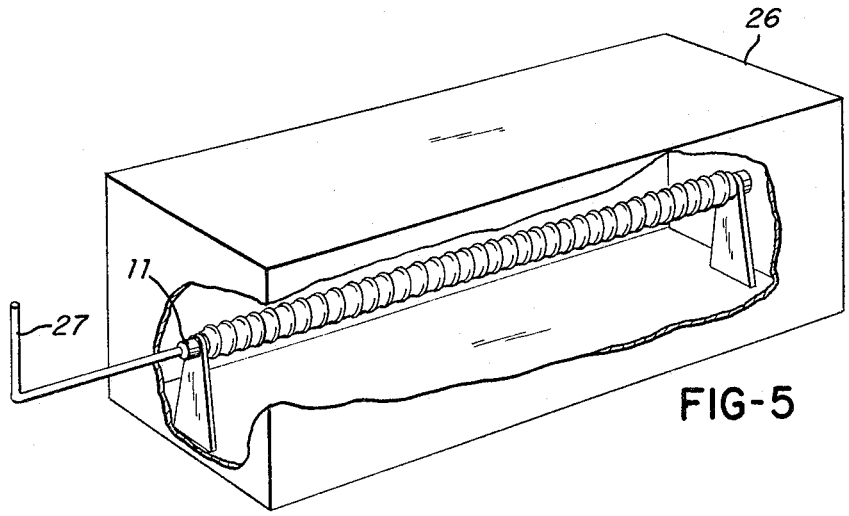
FIGURE 5 is a perspective view partially broken away illustrating still another step in the novel process.

As a next step in the process, the entire assembly is placed within a heating chamber 26 as illustrated in FIGURE 5. The assembly is then exposed to a temperature of approximately 300° F. which causes several bonding steps to take place. The coating of the stockinet will flow into the tube, and since they are preferably of the same material, will cause a very secure bond between these two members throughout the entire mating surfaces. At the same time, some of this coating will also flow inward and cause a bond with the outer peripheral surface of the coating on the coils of the reinforcement since this coating is also preferably of similar material. The cord 21 may be held purely by mechanical forces to the position shown, or a small amount of the coating material on the stockinet may flow in among the fibers of the cord to create somewhat of a bond. After the heating step has been completed, vacuum may be applied through the tube 27 and thence into the interior of the mandrel 11 and through the aperture 12. This will result in insuring that the inwardly extending convolutions of the stockinet and tube will remain as deep as originally desired; at the same time there will be a slight tendency for the cord 21 to shrink inwardly and further enhance the depth of the corrugations. As a result, flexibility will be maintained. After this step the assembly is removed and allowed to cool in water or air. It should be noted that the heating chamber 26 illustrated in FIGURE 5 is not necessarily the only method of heating the assembly, since this may also be done by infrared lamps, induction heating, or other well-known means.

Figure 6:
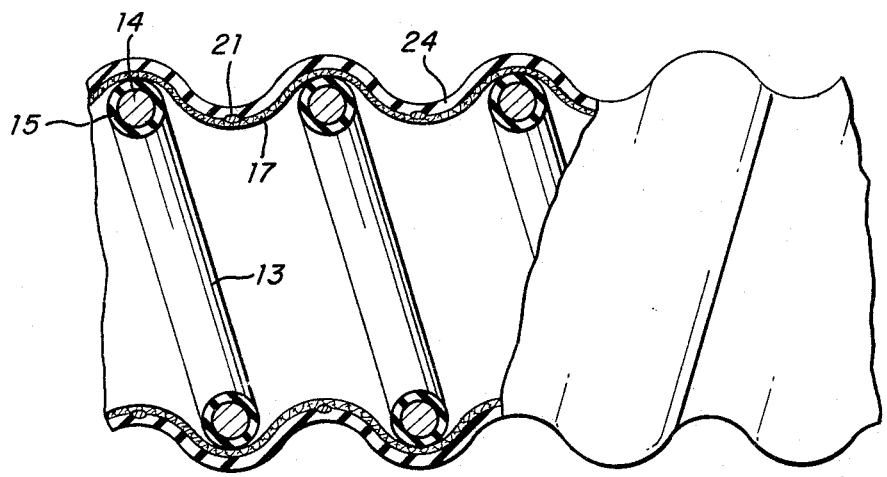
FIGURE 6 is an elevational view in partial section illustrating the finished product manufactured in accordance with the invention.

The completed assembly is illustrated in FIGURE 6 and now consists of an outer tube 24 bonded to the stockinet 17, and a reinforcement 13 which is bonded to the stockinet at contacting surfaces. The cord 21 is located as shown between the coils, and will be slightly flattened and forced partly into the stockinet and partly into the outer tube so that the outer surface of the assembly will be smooth. The resulting product is one which has an unusually high degree of strength in resisting high positive or vacuum pressures conducted through the hose and yet is highly flexible. The use of the cord 21 creates a highly uniform product when viewed from the exterior, as well as maintaining uniform depth and therefore uniform flow at the interior. By virtue of the flow of elastomeric materials described, major problems of adhesion among the components have also been eliminated.

Figure 7:
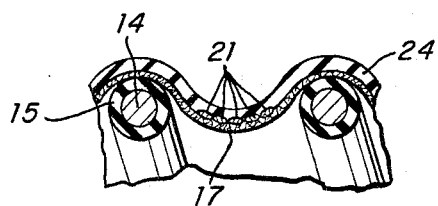
FIGURE 7 is an elevational view in partial section illustrating a modified form of the invention.

Other changes in the process described above are also contemplated as being within the scope of the present invention. One such change is illustrated in FIGURE 7, in which a modified form of the invention is depicted. The drawing illustrates a section of the finished hose in which five of the cords 21, instead of one, are utilized to create the inwardly extending corrugations. This is illustrative of the use of multiple cords. The process of making this hose is exactly as described above, except that anywhere from two to about seven cords 21 are simultaneously applied, side by side, from the same cord-feeding mechanism. Because of the additional cords, the hose is capable of withstanding higher pressures, due to the reinforcing effect created by the multiple cords.

The principal and modified forms of the invention may involve other variations within the scope of the invention. For example, the outer tube need not be manufactured by extrusion of a single tubular member as heretofore described, but may also be made by other methods; this member may be extruded continuously over the stockinet as described in United States Patent No. 2,963,749; or may be wound in the form of a strip with butting edges in a continuous spiral fashion in which the subsequent heating step will cause the material to flow and thus form the unitary tubular member.

What is claimed is:

1. A reinforced flexible corrugated hose comprising a helical reinforcement of elastomeric coated wire having axially spaced coils, a tubular knitted stockinet enveloping and bonded to said reinforcement, at least one elastomeric cord spirally wrapped around said stockinet, and a tube of elastomeric material enveloping and bonded to said stockinet.

2. The hose of claim 1 in which said cord is of a material similar to that of said stockinet.

3. The hose of claim 1 in which said cord is axially located between said coils.

4. The hose of claim 3 in which said cord is under radial tension.

5. The hose of claim 1 in which said stockinet is coated with an elastomeric material similar to that of the coating of said wire.

6. The hose of claim 5 in which said tube is of a material similar to that of the coating of said wire.

7. A reinforced flexible corrugated hose comprising a helical reinforcement of wire with elastomeric coating having axially spaced coils, a tubular knitted nylon stockinet coated with an elastomeric material similar to the material of said wire coating and enveloping and bonded to said coating, at least one nylon cord spirally wrapped around said stockinet axially between said coils and bonded to said stockinet, and a tube of elastomeric material similar to the material of said coating enveloping and bonded to said stockinet.

8. The hose of claim 7 in which said elastomeric material is vinyl.

References Cited by the Examiner

UNITED STATES PATENTS

| | | | |
|---|---|---|---|
| 1,280,170 | 10/1918 | Crawford | 138—122 |
| 3,180,364 | 4/1965 | Ohlson | 138—125 |

FOREIGN PATENTS 548,635  10/1942  Great Britain.

LAVERNE D. GEIGER, *Primary Examiner.*

SAMUEL ROTHBERG, H. S. BELL,
*Assistant Examiners.*